Aug. 9, 1949.   R. E. BYLER ET AL   2,478,652
PROCESS FOR THE RECOVERY OF PRECIOUS METAL VALUES
Filed Jan. 24, 1948
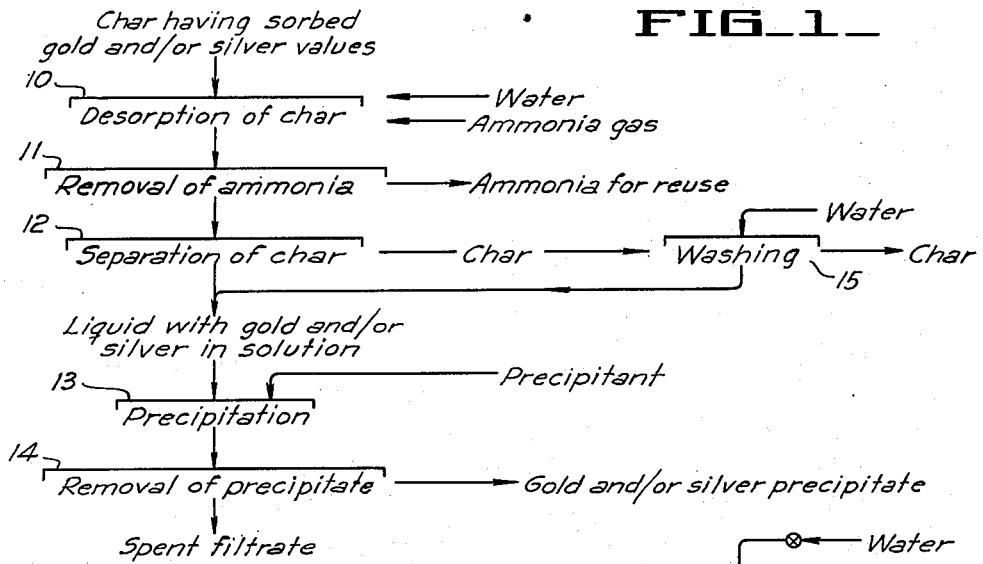
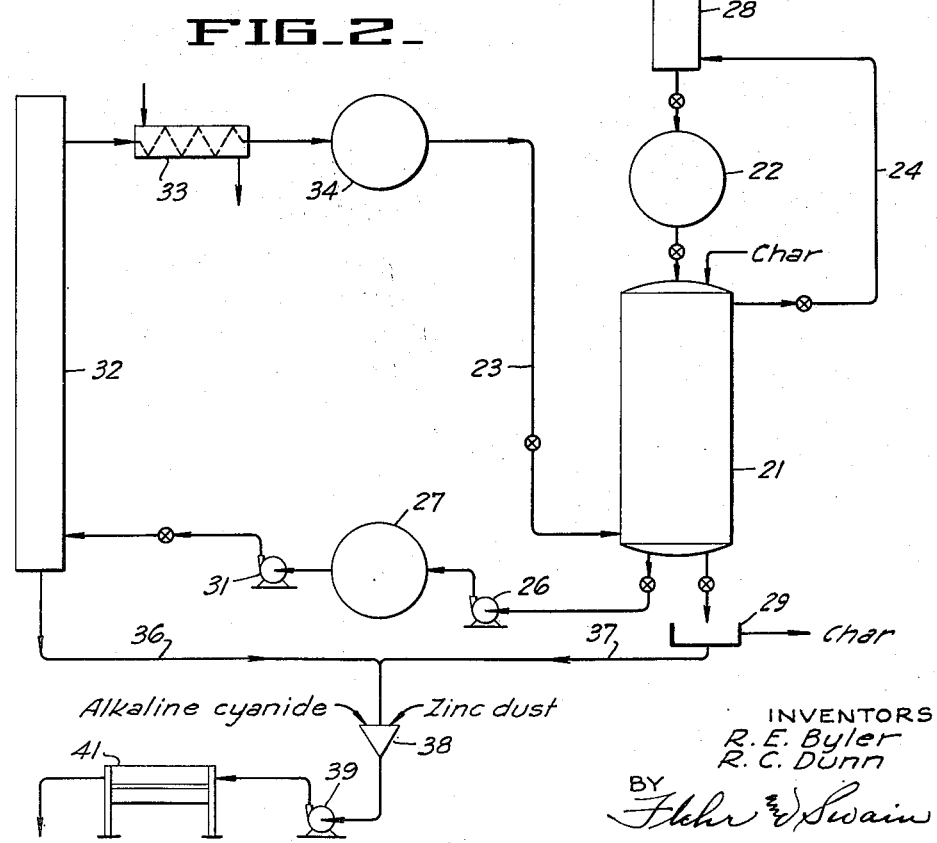
INVENTORS
R. E. Byler
R. C. Dunn
ATTORNEYS

Patented Aug. 9, 1949

2,478,652

UNITED STATES PATENT OFFICE 2,478,652

PROCESS FOR THE RECOVERY OF PRECIOUS METAL VALUES

Raymond E. Byler, Stanford University, and Robert C. Dunn, San Carlos, Calif., assignors to The Merrill Company, San Francisco, Calif., a corporation of California Application January 24, 1948, Serial No. 4,168

9 Claims. (Cl. 75—103)

This invention relates generally to processes for the dissolution and recovery of sorbed precious metal values from char.

In processes for the recovery of precious metal values (gold and/or silver) from ores, it has been proposed to dissolve the gold values in alkali-cyanide solutions, and then sorb the dissolved values on char. The char may be finely divided, in which event it is necessary to remove it from the solution by filtration, or from a cyanide pulp by flotation. Also it has been proposed to use a granular char for this purpose, which after the sorption of precious metal values can be readily removed from the cyanide-ore pulp by screening. Also it is possible to use a so-called magnetic char, which after the sorption operation can be removed by means of a magnetic separator.

Prior to the present invention there has been no satisfactory or practical method for the removal or desorption of the sorbed values from the char, leaving the char in condition for re-use. It has been proposed to utilize a solution of sodium sulphide for this purpose, but it is recognized that this treatment is not effective for the removal of sorbed silver values, and should even a small amount of silver be present in the ore and sorbed with the gold on the char, the use of sodium sulphide causes rapid deterioration in the sorptive power of the char so that it cannot be effectively re-used. Furthermore no inexpensive method is available for recovering the dissolved gold from the sodium sulphide solution. The limitations and difficulties of prior desorption processes have discouraged the use of char for the recovery of precious metals in commercial operations, particularly since such processes are less economical if it is necessary to destroy the char by burning or smelting in order to recover the precious metals therefrom.

It is an object of the present invention to provide a process for the dissolution and recovery of sorbed precious metal values from char, which will be free of the limitations and difficulties of prior proposed processes.

A further object of the invention is to provide a process of the above character which is effective for both gold and silver values, either sorbed separately or together on the char.

Another object of the invention is to provide a desorption process which leaves the char in an active condition for sorbing.

A further object of the invention is to provide a desorbing agent which can be repeatedly re-used without loss in effectiveness.

Another object of the invention is to provide a process of the above character which is economical for commercial use, and which is relatively efficient in recovering the desired values from the char.

Additional objects of the invention will appear from the following description in which the preferred embodiment of the invention has been set forth in detail in conjunction with the accompanying drawings.

Referring to the drawings—

Figure 1 is a flow sheet illustrating one manner of practicing the process.

Figure 2 is a flow diagram illustrating a more detailed procedure for practicing the process.

In our process we make use of ammonia as a desorbing agent. The process is predicated upon our discovery that a remarkable and unexpected shift in equilibrium of the desorption reaction takes place as concentration of ammonia in solution is increased to a range extending beyond about 28% by weight. By utilizing our discovery we have been able to obtain rapid and substantially complete desorption of sorbed gold and silver values from char, and without using excessive amounts of the ammonia solution.

In the prior art investigators have attempted to solve the problem of dissolving or desorbing precious metals from char and have tried many reagents, including dilute aqua-ammonia solutions (see Technical Paper No. 378 by Gross & Scott, published 1926, U. S. Bureau of Mines). As a result of their experiments using ammonia solutions, these investigators obtained a maximum desorption of 5.9% of the sorbed gold and 13.59% of the sorbed silver. These recoveries are negligible and inadequate for commercial purposes and hence the use of ammonia has not been considered practical. Our discovery is therefore contrary to the teachings of prior art, and produces remarkable and unexpected new results as will be presently explained.

Various procedures can be used for carrying out our process. However, in general, the char is contacted with ammonia gas in solution at a concentration in a range extending beyond about 28% by weight, and preferably while the char is immersed or intimately contacted with said solution. Under such conditions a relatively complete reaction occurs between the sorbed gold and/or silver and the ammonia, and according to our observations this reaction results in the formation of gold and/or silver ammines. Either simultaneously with or immediately following this reaction the gold and/or silver ammines are dissolved in the ammonia solution. At the end of this dissolution or desorption operation the ammonia solution is drawn off from the char, and the char freed of residual ammonia as by vacuumizing and washing with water. The char is then in proper state for re-use in sorbing further precious metals. It is a relatively simple matter to recover the dissolved precious metals from the small volume of liquid in which they are concentrated by our process. One procedure is to precipitate the values by the use of a suitable precipitant, together with a suitable chemical activator. Prior to the precipitation operation it is desirable to recover (for re-use) substantially all or a major part of the ammonia gas from the said solution.

The flow sheet of Figure 1 illustrates a procedure such as described above. Char containing sorbed gold and/or silver values is shown being supplied to the desorption operation 10. In a typical instance the char may be in the form of relatively hard or non-crumbling granules which have been separated from a cyanide pulp by screening. The desorption operation 10 can be carried out by introducing a charge of the char into a chamber containing a sufficient amount of water or weak ammonia solution to immerse the char. The chamber is provided with a lower inlet connection for introducing ammonia gas, and an upper valve controlled vent. With the vent open, ammonia gas is introduced until air has been flushed from the chamber. The vent is then closed and introduction of ammonia gas under pressure continued to form a saturated water-ammonia solution, during which time the pressure gradually rises as introduction of the gas proceeds. After attaining a pressure and temperature which will insure substantially complete dissolution without too long a period of retention, as for example pressures of the order of from 80 to 120 p. s. i. absolute or more, at average temperatures such as from 40 to 90° F., further introduction of gas is made as required to maintain the pressure in the chamber during the retention period.

Operation 11 represents removal of ammonia gas from the water-ammonia solution, as by boiling off of gas in conjunction with release of pressure. The gas thus obtained can be recompressed and stored in liquid form for re-use in operation 10. If desired removal of the gas can be made more complete by application of a partial vacuum.

Operation 12 represents the separation of the char from the liquid, and can be carried out by simple screening. The remaining liquid contains gold and/or silver in solution in the form of metal ammines. The precipitating operation 13 serves to precipitate the desired metals from the solution, and can be carried out by introducing suitable amounts of zinc or aluminum powder together with a chemical activator such as sodium or potassium cyanide in the case of zinc dust, or caustic soda in the case of aluminum powder. The precipitate is then removed at 14 as by passing the mixture through a suitable filter. The solid material collected in this manner is a comparatively pure gold and/or silver concentrate, which can be treated by known smelting methods to form relatively pure metal.

In the sequences of steps illustrated in the flow sheet of Figure 1, the ammonia is removed from the liquid before the char and liquid are separated. This enables the separation of char and liquid to be carried out at atmospheric pressure. The screening operation can be eliminated by placing the charge of char in a wire mesh basket or like foraminous holder, which can later be removed from the liquid.

Char recovered at 12 is freed of its residual ammonia, as by washing at 15, and wash water merged with solution from 12.

In the event the char entering the process is magnetic in character, then it is possible to use magnetic separation for the operation 12 in place of screening.

The process is simplified by the use of granular char because of the ease with which such material can be separated from the liquid. Assuming, however, that finely divided char is treated, then suitable means such as a filter can be used for effecting its removal from the liquid.

Figure 2 shows diagrammatically a preferred system and procedure of applying our process, in which we recover and return for re-use the ammonia gas without the necessity of a compressing step.

The char with its sorbed gold and silver is introduced into the pressure desorbing chamber 21. Weak water-ammonia solution from storage 22 is then run into chamber 21 until the char is submerged. Ammonia gas is then introduced through the line 23 and the vent-line 24 at the top of the chamber is opened to permit air to be displaced from the chamber, following which the vent-line is closed and the pressure of the ammonia gas is allowed to build up in the chamber to a desired point, for example 100 p. s. i. gage, and is maintained at this point during the required retention period to effect the desorbing reaction. Following the desorption treatment the strong ammonia liquor is drawn off from the desorbing chamber 21 by pump 26 and delivered to surge or intermediate storage tank 27, where the pressure over the liquid approximates that which existed in the pressure desorbing chamber 21. The gaseous ammonia remaining in the chamber 21 is then discharged through line 24 to the scrubber 28 where it is absorbed in water and subsequently stored in tank 22. A vacuum may preferably be applied at the end of this operation to draw off residual ammonia from the tank and char therein. Water may then be introduced into the desorbing chamber 21 to wash the char and sluice it out of the chamber, the char being then removed from the wash water by screen 29, if the char is granular, or by a filter or other suitable means if the char is too finely divided for practical screening.

From intermediate storage tank 27 the ammonia liquor is continuously fed by the pump 31 to a high pressure ammonia fractionating column 32 which is operated so as to effect substantially complete rectification and which delivers the ammonia gas as a top product, to be condensed in condenser 33 and delivered to an anhydrous ammonia storage tank 34 in which the liquid ammonia is stored and in which the gaseous pressure substantially exceeds pressures used in the desorbing chamber 21. The degassed bottom product of the fractionating column 32 is joined with the wash water from the char as indicated by flow lines 36 and 37, for precipitation of the contained precious metals. For economy in operation the bottom product of the fractionating column may be passed through a heat exchanger in which heat energy is transferred from this product to the incoming ammonia liquor fed to the fractionating column from pump 31. The precipitation may be carried out, as indicated in this case, by the introduction into mixing cone 38 of a small quantity of zinc dust and alkaline cyanide by means of conventional feeders, from which the solution is delivered by pump 39 to a conventional precipitate filter 41 where the metals are removed as a substantially pure precipitate.

The type of char which we prefer to use is one which is relatively active in sorbing gold and/or silver values, and one having sufficient hardness to be substantially non-crumbling. In other words it should not be subject to any substantial degree of crumbling during handling of the same, including agitation with cyanide pulp during adsorption of values, screening from the pulp, and handling in the dissolution process described herein. Assuming that the char is to be used in cyanide ore pulps and removed by screening, it should be such that its particle size is greater than the largest particles of the ore solids in the pulp, and adsorptivity in granular form should be such that it sorbs precious metal values from the pulp at a reasonable degree of efficiency. Chars having the above properties are available in the United States and are known generally as granular activated char or carbon.

Specific examples of the present process are as follows:

Example 1

One gram of activated char, minus 20 plus 30 mesh in screen size, and of the type used by the United States Chemical Warfare Service for gas masks, was contacted for 20 hours with 1 liter alkaline cyanide solution containing 3.590 mgs. gold, 62.5 mgs. sodium cyanide, and 12.25 mgs. lime. Analysis of the solution at the end of this period gave a residual gold content of .016 mg., showing the char had sorbed 3.574 mg. gold or an amount equivalent to 104.2 ounces per ton of char.

The one gram of said char with its sorbed gold was introduced into a cylindrical pressure vessel containing 50 ml. water, the water being to a depth sufficient to immerse the char. The vessel was then closed with a sealed cover and the lower portion of the vessel was connected to a source of anhydrous ammonia gas under pressure. The gas was then permitted to bubble upward through the liquid, with the vent at the top of the vessel open to the atmosphere, for about 15 minutes which was sufficient to displace the air from the vessel. The vent at the top of the vessel was then closed and introduction of ammonia gas continued until the pressure within the vessel, as indicated by a gauge connected to the vessel, was gradually increased from atmospheric to 100 pounds per square inch gage (this being the pressure, in this case, of the source of the gas). Some heat of solution was evolved during introduction of the gas, which together with heat of reaction caused the contents of the chamber to rise in temperature from 65° F. initially to a maximum of 120° F. from which point the temperaturle dropped to 80° F. at the end of the treatment period. Further introduction of anhydrous ammonia gas was then made only as required to maintain the pressure in the vessel, during a contact or retention period of 150 minutes. After this retention period the top of the vessel was then connected to an ammonia absorption system, and as the pressure within the vessel was relieved ammonia boiled from the solution and was collected for re-use. Upon reaching atmospheric pressure, the contents of the vessel were discharged and the char removed by screening. Analysis of this char showed a residual gold content equivalent to only 0.3 ounce gold per ton of char, showing 99.7% of the gold was desorbed from the char by our process.

Example 2

In the second example showing the efficiency of our process in respect to silver, the char was contacted with a cyanide solution containing dissolved silver until the char had sorbed silver in amount equivalent to 91.5 ounces per ton of char. The char was then treated by our process, following the procedure outlined in the preceding example, to recover the sorbed silver.

Following the desorption operation of our process, an analysis of the char showed a residual silver content equivalent to 0.58 ounce per ton. Our process therefore recovered 99.4% of the sorbed silver.

Example 3

In the following example, the effectiveness of our process in desorbing combined gold-silver values from the char, and in delivering the char in activated condition for re-use, is demonstrated by a cyclic test. In this test, the char was first contacted with cyanide solution containing both gold and silver values as follows: 3.668 mg. gold per liter, 3.862 mg. silver per liter, cyanide equivalent to .075 pound per ton of solution, and lime equivalent to 0.12 pound per ton of solution. Char was added to this solution in amount equivalent to 2 pounds per ton of solution, and agitated for 22 hours to sorb gold and silver, after which the char was removed from the solution by screening and then desorbed by our process, as in Example 1, above. The residual ammonia on the desorbed char was then thoroughly removed (in this case simply by placing the char in boiling water for a few minutes) and the char was then placed in contact with another equal portion of the gold-silver cyanide solution, as before. This alternate sorption-desorption cycle was repeated 16 times, at the end of which there had been recovered in the char desorbing operation, 99.8% of the gold and 99.9% of the silver which had been sorbed by the char from the gold-silver cyanide solution. The sorbing activity of the char remained high during the 16 cycles, an average of 98.6% gold and 91.2% silver being sorbed per cycle from the cyanide solution. The data are as follows:

Example 3

| Cycle | Gold | | Silver | |
|---|---|---|---|---|
| | Originally in Cyanide Solution | Sorbed on Char | Originally in Cyandie Solution | Sorbed on Char |
| 1 milligram | 3.668 | 3.657 | 3.862 | 3.757 |
| 2 do | 3.668 | 3.652 | 3.862 | 3.728 |
| 3 do | 3.668 | 3.652 | 3.862 | 3.669 |
| 4 do | 3.668 | 3.652 | 3.862 | 3.734 |
| 5 do | 3.668 | 3.637 | 3.862 | 3.611 |
| 6 do | 3.668 | 3.637 | 3.862 | 3.657 |
| 7 do | 3.668 | 3.627 | 3.862 | 3.594 |
| 8 do | 3.668 | 3.631 | 3.862 | 3.553 |
| 9 do | 3.668 | 3.626 | 3.862 | 3.506 |
| 10 do | 3.668 | 3.614 | 3.862 | 3.563 |
| 11 do | 3.668 | 3.611 | 3.862 | 3.438 |
| 12 do | 3.668 | 3.590 | 3.862 | 3.466 |
| 13 do | 3.668 | 3.591 | 3.862 | 3.393 |
| 14 do | 3.668 | 3.559 | 3.862 | 3.246 |
| 15 do | 3.668 | 3.553 | 3.862 | 3.258 |
| 16 do | 3.668 | 3.538 | 3.862 | 3.243 |
| Total do | 58.688 | 57.827 | 61.792 | 56.416 |
| Residual metal on char (by assay) at end of 16th cycle milligram | | 0.075 | | 0.085 |
| Total metal recovered from the char in the desorption steps (of the 16 cycles) milligram | | 57.752 | | 56.331 |
| Percent recovered from Cyanide Solution by sorption on char percent | | 98.6 | | 91.2 |
| Percent of sorbed metal recovered from the char by desorption percent | | 99.8 | | 99.9 |

Example 4

Similar results are obtained by the application of our process using various types of available activated chars as, for example, magnetic char sold under the trade-name of "Aerochar" by the American Cyanamid Co. A sample of this char was contacted with a gold-cyanide solution to sorb the dissolved values, subsequently removed from solution, and the sorbed values recovered from the char by our process, as follows:

One gram of plus 48 mesh Aero magnetic char was contacted for 24 hours with 1 liter of alkaline cyanide solution containing 3.550 mg. gold, 69.0 mg. sodium cyanide, and 6.0 mg. lime. The char was then removed from the solution and the tail solution assayed:

Assay of original solution_____ 3.550 mg. gold
Assay of tail solution_____ 1.250 mg. gold Mg. gold removed by the char____ 2.300
Per cent gold sorbed by the char_ 64.8

The char was then desorbed by our process, using the procedure described in Example 1, and 2.270 mg. of gold were recovered in the solution from the desorbing step showing a recovery of 98.7% of the gold from the char by our process.

*Example 5*

An example follows showing results obtained on another char, namely "Nuchar," supplied by the Industrial Chemical Sales Division of West Virginia Pulp & Paper Co. of New York. The sample used was granular minus 10 plus 30 mesh in sieve size.

One gram of this char was contacted for 20 hours with 1 liter of alkaline cyanide solution containing 3.580 mg. gold, 69.0 mg. sodium cyanide, and 12.5 mg. lime. At the end of this period the char was removed by screening, and the cyanide solution assayed for residual gold to obtain the percent of gold sorbed on the char. The char was then desorbed by our process, proceeding as described in Example 3, and the spent solution from the desorbing operation was assayed to determine the gold recovered from the char.

The desorbed char was again contacted as before with another portion of the gold cyanide solution having the same contents as originally. This sorbing-desorbing cycle was repeated three times with the following results:

| Cycle | Gold sorbed (by char from cyanide solution) | | Gold desorbed (from char by our process) | |
|---|---|---|---|---|
| | Milligrams | Percent | Milligrams | Percent |
| 1 | 3.523 | 98.4 | 3.405 | 96.5 |
| 2 | 3.523 | 98.4 | 3.610 | 102.2 |
| 3 | 3.523 | 98.4 | 3.470 | 98.5 |

The cyclic tests indicate substantially complete recovery of sorbed gold from the char by our process, and that the char retains its original sorbing activity after desorbing by our process.

According to our observations the remarkably effective results obtained by our process can be explained as follows: When low concentrations of water-ammonia solutions are used, such as dilute aqua-ammonia, there is removed from the char only a small percentage of the sorbed gold or silver, presumably because the reaction reaches equilibrium when only small concentrations of the metals have been reached in the aqueous ammonia solution. However, when relatively concentrated water-ammonia solutions are used, such as solutions having a concentration of ammonia in a range extending beyond about 28% by weight, as by the procedures described herein, the effect is totally different, and the desorption reaction proceeds substantially to completion because of the unexpected shift in the equilibrium of the reaction.

It will be evident from the foregoing that our process is highly effective and economical for the desorption of precious metals from char. A relatively small amount of chemical is required to carry out the process, the chemical is repeatedly re-used, and the equipment required is simple in design. The process operates equally well for both gold and silver values. Our process does not materially impair the adsorptivity of the char and enables repeated re-use of the char for sorbing purposes.

We claim:

1. In a process for the removal of sorbed gold and silver values from char, the steps which comprise, contacting char having at least one of said values sorbed thereon with a water-ammonia solution having a concentration of ammonia in a range extending above about 28% by weight, whereby desorption of said values from said char occurs, and separating the resulting solution containing said values from said char.

2. In a process for the removal of sorbed gold and silver values from char, the steps which comprise, contacting char having at least one of said values sorbed thereon with a water-ammonia solution having a concentration of ammonia in a range extending above about 28% by weight, whereby desorption of said values from said char occurs, separating the resulting solution containing said values from said char, and precipitating and recovering said values from said resulting solution.

3. In a process for the removal of sorbed gold and silver values from char, the steps which comprise, contacting char having at least one of said values sorbed thereon with a water-ammonia solution having a concentration of ammonia in a range extending above about 28% by weight to convert said values into metal amines soluble in said solution, whereby desorption of said values from said char occurs, separating the resulting solution containing said soluble amines from said char, and precipitating and recovering said metal from said resulting solution.

4. In a process for the removal of sorbed gold and silver values from char, the steps which comprise, contacting char having at least one of said values sorbed thereon in a closed chamber with a substantially saturated water-ammonia solution at a pressure between approximately 80 and 120 pounds per square inch absolute and a temperature between approximately 40° and 90° F. to thereby cause desorption of said values from said char, and separating the resulting solution containing said values from said char.

5. In a process for the removal of sorbed gold and silver values from char, the steps which comprise, contacting char having at least one of said values sorbed thereon in a closed chamber with a substantially saturated water-ammonia solution at a pressure between approximately 80 and 120 pounds per square inch absolute and a temperature between approximately 40° and 90° F. to thereby cause desorption of said values from said char, separating the resulting solution containing said values from said char, and precipitating and recovering said values from said resulting solution.

6. In a process for the removal of sorbed gold values from char, the steps which comprise, contacting said char with a water-ammonia solution having a concentration of ammonia in a range extending above about 28% by weight, whereby desorption of said gold values from said char occurs, and separating the resulting solution containing said gold values from said char.

7. In a process for the removal of sorbed silver values from char, the steps which comprise, contacting said char with a water-ammonia solution having a concentration of ammonia in a range extending above about 28% by weight, whereby desorption of said silver values from said char occurs, and separating the resulting solution containing said silver values from said char.

8. In a process for the removal of sorbed gold values from char, the steps which comprise, contacting said char with a water-ammonia solution having a concentration of ammonia in a range extending above about 28% by weight, whereby desorption of said gold values from said char occurs, separating the resulting solution containing said gold values from said char, and precipitating and recovering said values from said resulting solution.

9. In a process for the removal of sorbed silver values from char, the steps which comprise, contacting said char with a water-ammonia solution having a concentration of ammonia in a range extending above about 28% by weight, whereby desorption of said silver values from said char occurs, separating the resulting solution containing said silver values from said char, and precipitating and recovering said values from said resulting solution.

RAYMOND E. BYLER.
ROBERT C. DUNN.

REFERENCES CITED

The following references are of record in the file of this patent:

U. S. Bureau of Mines, Technical Publication #378, by Gross and Scott (1927), page 49.

Chemical Engineers Handbook, by Perry, 2nd ed., 1941, page 406.